United States Patent [19]

Holmes-Farley et al.

[11] Patent Number: 5,096,962

[45] Date of Patent: Mar. 17, 1992

[54] ACRYLIC ADHESIVE COMPOSITIONS

[75] Inventors: S. Randall Holmes-Farley, Arlington, Mass.; Kirk J. Abbey, Raleigh, N.C.

[73] Assignee: Lord Corporation, Erie, Pa.

[21] Appl. No.: 619,792

[22] Filed: Nov. 29, 1990

[51] Int. Cl.$^5$ ............... C08K 5/36; C08K 81/00; C08K 85/02; C08K 83/00; C08L 81/00; C08L 85/02; C08L 83/00; C08F 4/06

[52] U.S. Cl. ............... 524/742; 525/535; 525/538; 525/474; 526/90; 526/128; 526/139; 526/140

[58] Field of Search ............... 524/742

[56] References Cited

U.S. PATENT DOCUMENTS

| | | | |
|---|---|---|---|
| 3,862,883 | 1/1975 | Cantor | 525/132 |
| 3,880,956 | 4/1975 | Skoultchi | 260/89.5 R |
| 3,957,561 | 5/1976 | Skoultchi | 156/331 |
| 4,052,244 | 10/1977 | Skoultchi | 156/310 |
| 4,081,308 | 3/1978 | Skoultchi | 156/310 |
| 4,223,115 | 9/1980 | Zalucha et al. | 525/455 |
| 4,467,071 | 8/1984 | Dawdy | 525/112 |
| 4,703,089 | 10/1987 | Damico | 525/245 |
| 4,855,001 | 8/1989 | Damico et al. | 156/307.3 |
| 4,857,131 | 8/1989 | Damico et al. | 525/438 |

*Primary Examiner*—Joseph L. Schofer
*Assistant Examiner*—Wu C. Cheng
*Attorney, Agent, or Firm*—W. Graham Buie

[57] ABSTRACT

A one-component adhesive for metal surfaces such as iron, zinc, copper, cadmium and their alloys that will cure upon contact with the metal surface. The adhesive composition includes an olefinically unsaturated monomer; an acidic compound; a sulfonyl-containing compound; and a compound containing a transition metal. The adhesive composition may also optionally contain additional polymeric materials and will cure rapidly upon contact with a metal surface to form an adhesive bond between metal surfaces. The adhesive composition avoids the use of halide-containing compounds which can be undesirable in certain applications.

21 Claims, No Drawings

ACRYLIC ADHESIVE COMPOSITIONS

FIELD OF THE INVENTION

The present invention relates to structural adhesive compositions. More particularly, the invention relates to shelf-stable, one-package acrylic structural adhesive compositions that are curable at ambient temperature conditions and that avoid the use of halide-containing compounds.

BACKGROUND OF THE INVENTION

Acrylic structural adhesives are well-known articles of commerce which are extensively used commercially for bonding metal and plastic materials. The acrylic adhesives typically comprise a mixture of one or more olefinically-unsaturated reactive monomers and curing agents, with cure of polymerization being effected through a free radical or ionic polymerization mechanism. The adhesives preferably contain one or more polymeric materials which may or may not be reactive, that is, capable of being polymerized, per se, or at least capable of interpolymerizing with the reactive monomers, such as grafting onto or crosslinking the growing polymers from the reactive monomer polymerization. In addition, the adhesives can contain other additives for improving adhesion to substrate materials, environmental resistance, impact strength, flexibility, heat resistance, and the like.

The polymerization (cure) of acrylic structural adhesives can be initiated by free radical generators such as peroxygen compounds, usually in combination with accelerators to increase the rate of free radical formation. It has been long recognized, in those applications where at least one substrate was a metal surface, that at least certain metals, such as iron, copper, tin, aluminum, silver and alloys of such metals, exhibited a catalytic effect upon the cure, which was not always positive; that is, in some instances, the metal substrate tended to poison the desired reaction.

There have been many attempts to utilize the catalytic effect of metals. For example, it has been proposed to pretreat non-catalytic surfaces with a catalytic salt solution, such as the resinates of iron, copper or cobalt (see Lees U.S. Pat. No. 3,658,254, column 1, lines 29–52). The Lees patent itself is directed to two-package anaerobic acrylic adhesive compositions whose effectiveness was not influenced by the catalytic or non-catalytic character of the substrate. Skoultchi, in U.S. Pat. Nos. 3,880,956 and 3,957,561, discloses anaerobic acrylic adhesive compositions which are activated by contact with metal surfaces. The compositions of Skoultchi U.S. Pat. No. 3,880,956 are single-package anaerobic compositions containing diazonium salt catalysts which cure through a free radical polymerization mechanism when excluded from air or oxygen and in contact with certain metal surfaces such as iron, copper, tin, aluminum, silver, alloys of these metals, and cadmium, chromium, nickel, and zinc chromate platings. Skoultchi U.S. Pat. No. 3,957,561 discloses one-package anaerobic compositions utilizing a two-component catalyst system comprising at least one diazosulfone compound and o-sulfobenzimide which cure through a free radical polymerization mechanism when the adhesive is excluded from air or oxygen and in contact with active metal surfaces (the same surfaces described in Skoultchi '956). On the other hand, Skoultchi, in U.S. Pat. No. 4,052,244, utilizes copper in the form of a copper salt of saccharin or p-toluenesulfonic acid to provide two-package anaerobic adhesives whose cure is otherwise not dependent on substrate composition. In another development, Skoultchi, in U.S. Pat. No. 4,081,308, discloses two-package adhesives which utilize, in one package, copper saccharinate or saccharin in combination with a soluble copper salt, and in the other package, an alpha-hydroxy sulfone, an alpha-aminosulfone or mixtures of such sulfones, as catalytic agents for the free radical curing of the anaerobic acrylic adhesive compositions. The cure of the Skoultchi U.S. Pat. No. 4,081,308 compositions is independent of substrate composition.

More recent patents (Damico, U.S. Pat. Nos. 4,703,089; 4,855,001; and related 4,857,131) provide one-package acrylic adhesives which cure at ambient temperatures when brought into contact with certain metal surfaces, whether or not air or oxygen is excluded. Those inventions require that the adhesive contain an olefinically unsaturated monomer, a polymeric material, a sulfonyl halide, a transition metal, and an acidic compound. Although these sulfonyl halide-containing adhesives are very effective in many applications, the presence of the halide ions may, in some instances, catalyze or promote corrosion which may lead to the degradation of the adhesive bond. Furthermore, a sulfonyl halide-containing adhesive may be somewhat limited with respect to the inclusion of additional adhesive components, such as polyols, amines, and polyamines, since these hydroxyl- and amine-containing compounds are known to undergo undesirable reactions with sulfonyl halides.

A need therefore exists for a one-package acrylic adhesive which will cure at ambient temperatures when brought into contact with certain metal surfaces regardless of the presence of air or oxygen. It would also be desirable for such an adhesive to eliminate the use of halide-containing compounds that may lead to corrosion and degradation of the adhesive bond and that may prevent the utilization of hydroxyl- and amine-containing compounds, which would otherwise aid in adhesion for certain applications.

SUMMARY OF THE INVENTION

The present invention is such a one-package acrylic adhesive that effectively cures regardless of the presence of air or oxygen and that eliminates the use of halide-containing compounds. The invention is based on the surprising discovery that certain sulfonyl-containing compounds can be substituted for the sulfonyl halide compounds utilized in the acrylic adhesive compositions described above without a decrease in bonding ability. The present adhesive compositions exhibit equivalent or improved performance when compared to sulfonyl halide-containing acrylic adhesive compositions without the potential disadvantages related to the presence of halide-containing compounds.

In particular, the single-package adhesive compositions of this invention comprise, in admixture, (A) at least one olefincially unsaturated monomer;
(B) an acidic compound having at least one organic or inorganic acid group;
(C) at least one sulfonyl-containing compound selected from the group consisting of certain sulfonyl-sulfur, sulfonyl-phosphorus and sulfonyl-silicon compounds hereinafter defined; and (D) at least one organic or inorganic compound containing at least one reducible transition metal, said metal having its valence electrons in a "d" subshell, said metal being selected from the elements of classes Ib, IIb, IIIb, IVb, V, VIb, VIIb, or VIII on the periodic chart of the elements; with copper, zinc, iron, cobalt and nickel being preferred, with copper being especially preferred, said metal being most preferably in its highest oxidation state;

wherein the amount of said olefinically unsaturated monomer is in the range from about 10 to 90, preferably about 17 to 87, percent by weight; the amount of said acidic compound is in the range from about 0.05 to 20, preferably about 0.1 to 15, percent by weight; the amount of said sulfonyl-containing compound is in the range from about 0.05 to 5, preferably about 0.5 to 2, percent by weight; and the amount of said transition metal compound is in the range from about 0.05 to 5, preferably about 0.5 to 2.5, percent by weight; said weight percents being based on the total weight of the adhesive composition.

The present adhesive compositions can optionally contain one or more polymeric materials which will provide additional flexibility and toughness in certain applications. The additional polymeric material can be selected from the group consisting of:

(a) at least one olefincially unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;

(b) at least one butadiene-based elastomeric polymeric material selected from the group consisting of:
 (1) a homopolymer of butadiene;
 (2) a copolymer of butadiene and at least one monomer copolymerizable therewith selected from the group consisting of styrene, acrylonitrile, methacrylonitrile and mixtures thereof;
 (3) a modified elastomeric polymeric material selected from the group consisting of butadiene homopolymer and copolymer as previously defined, such as homopolymer and copolymer having been modified by copolymerization therein by trace amounts up to about 5 percent by weight, based on the weight of modified elastomeric material, of at least one functional monomer; and
 (4) mixtures thereof;

(c) at least one polymer-in-monomer syrup consisting essentially of
 (1) from about 10 to 98 percent by weight of at least one olefinically unsaturated monomeric compound having at least one

group;
 (2) from about 2 to 90 percent by weight of at least one polymer derived from such (C)(1) monomers;
 (3) from about zero to 30 percent by weight of at least one polymer containing the group $(CH_2—CCl=CHCH_2)_n$, wherein n is an integer;

wherein (C)(2) is present as a partial polymerization product of (C)(1) or of (C)(1) in the presence of (C)(3); the mixture of (C)(1) and (C)(2) or of (C)(1), (C)(2) and (C)(3) being a syrup of polymer dissolved or dispersed in unpolymerized monomer, in which syrup the amount of (C)(2) derived from (C)(1) is in the range from about 2 to 90 percent, based on the total weight of (C)(1), (C)(2) and (C)(3);

(d) at least one polymeric material selected from the group consisting of polyvinyl alkyl ether, styrene acrylonitrile resin, unsaturated polyester resin and mixtures thereof, the alkyl moiety of such ether containing from 1 to 8 carbon atoms;

(e) at least one homopolymer or copolymer of at least one olefinically unsaturated monomer selected from the group consisting of styrene and alkyl or hydroxyalkyl esters of acrylic and methacrylic acid, said ester having 1 to 18 carbon atoms in the alkyl moiety; and (f) at least one phenoxy resin comprised of recurring units represented by the formula:

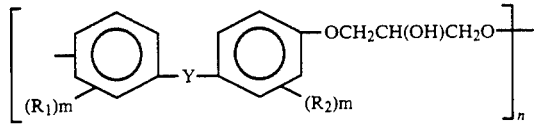

wherein Y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; m is zero or an integer 1–4, n is 10 to 250; and (g) mixtures of such polymeric materials.

The adhesive compositions of the invention can also optionally contain up to about 60, preferably not more than about 30, percent by weight, based on total weight of the adhesive composition, of at least one polymeric material having an intrinsic viscosity in the range from about 0.1 to 1.3, such polymeric material being obtained from the polymerization or copolymerization of at least one styrene monomer, acrylic monomer, substituted acrylic monomer, olefinically-unsaturated non-acrylic monomer, or mixtures thereof; up to about 40, preferably not more than about 30, percent by weight, based on total weight of the adhesive composition, of at least one elastomeric material having a second-order glass transition temperature below about 5° C.; and up to about 10 percent by weight, based on total weight of the adhesive composition, of at least one unsaturated dicarboxylic acid ester.

DETAILED DESCRIPTION OF THE INVENTION

According to the present invention, an adhesive composition is provided which may be employed to effectively bond metal surfaces. The adhesive exhibits good bonding properties and weathering characteristics with zinc, copper, cadmium, iron, tin, aluminum, silver, chromium, alloys of such metals, and metallic coatings or platings of such metals such as galvanized steel. The surfaces of these metals, alloys and metallic platings can, for convenience be called "active surfaces" and this term is to be understood to include but not be limited to the mentioned metal species.

Adhesive compositions prepared according to this invention are useful as thread lock materials to be applied to the threads of a threaded fastener to form a tight bond between the fastener and its threaded receiving member, e.g., a bolt and nut. Other adhesive compounds prepared according to the invention are useful in the construction of building panels where the bonding of galvanized steel sheets to galvanized steel sheets is desired, as well as in bonding such galvanized sheets to other structural members. The use of structural adhesives avoids unsightly weld marks, exposed thread fasteners, exposed rivets, etc. Structural adhesives may be substituted in part for other mechanical fasteners, for example, in the transportation industry where exterior panels are secured to frame members or to other panel members by means of exposed fasteners, such as rivets, threaded fasteners, welding, etc. A number of the welds, rivets or threaded fasteners can be eliminated and their function can be performed by appropriate reliable structural adhesives in accordance with the present invention.

Monomeric liquid olefinically unsaturated compounds suitable for use in Component (A) of the adhesive compositions of the invention are characterized by the presence of at least one

group. The olefinically unsaturated group is preferably a vinyl group, more preferably terminally located, with acrylic and substituted acrylic monomers being currently preferred. When olefinically unsaturated monomers which do not contain acrylic or substituted acrylic groups are employed, they should be used in an amount not exceeding about 50, preferably not more than about 25 percent by weight, based upon the total weight of the adhesive composition. Representative olefinically unsaturated monomers include, without limitation, tetrahydrofurfuryl methacrylate, methyl methacrylate, butyl methacrylate, ethyl acrylate, diethlyene glycol dimethacrylate, methacrylic acid, acrylic acid, acrylonitrile, methacrylonitrile, styrene, vinyl styrene, vinyl acetate, chlorostyrene, glycidyl methacrylate, itaconic acid, acrylamide, methacrylamide, vinylidene chloride, 2,3-dichloro-1,3-butadiene, 2-chloro-1,3-butadiene, methylstyrene and n-butylstyrene with tetrahydrofurfuryl methacrylate being presently preferred.

The acidic compounds of Component (B) which are essential to the practice of the invention can include substantially any organic or inorganic acid having at least one acid group, and includes organic partial esters of such acids. The acidic compounds are in the nature of Bronsted acids, that is, compounds which can donate a proton. Suitable acidic compounds preferably have a pKa less than about 6, most preferably in the range from about 1.0 to 5. The acidic compounds should also be reasonably soluble in the adhesive compositions of the invention to facilitate homogeneous distribution of the acid throughout the composition. The selection of the acidic component is a function of the substrate to be bonded, as well as the desired adhesive performance, and provides the adhesive chemist considerable latitude in formulating adhesive compositions specifically designed for any particular end use. For example, organic acids, as well as organic partial esters of such acids are preferred for bonding ferrous metals and their alloys, but adhesives containing such organic acids can be prepared according to the invention which are effective bonding agents for non-ferrous metals, such as galvanized steel. Conversely, the inorganic acids, and the organic partial esters of such acids, are preferred for bonding non-ferrous metals and their alloys, but adhesives containing such inorganic acids can also be prepared which are useful for bonding ferrous metals and their alloys. In the general case, acidic compounds which contain both at least one acid group and at least one olefinically-unsaturated moiety are preferred.

Representative acidic compounds which are suitable for use in the practice of the invention include 2-hydroxyethyl methacrylate partial ester of phosphoric acid, 2-hydroxyethyl acrylate partial ester of phosphoric acid, phosphoric acid, benzenephosphonic acid, phosphorous acid, sulfuric acid, sulfurous acid, 2-ethylhexonic acid, formic acid, acetic acid, butyric acid, hexanoic acid, napthenic acid, lauric acid, linoleic acid, valeric acid, toluene sulfonic acid, nitrotoluene sulfonic acid, dichloroacetic acid, trichloroacetic acid, phenylacetic acid, sulfosalicylic acid, naphthalene disulfonic acid, acetoacetic acid, acrylic acid, methacrylic acid, aminobenzosulfonic acid, maleic acid, malonic acid, phthalic acid, suberic acid, succinic acid, and vinyl acetic acid with 2-hydroxyethyl methacrylate partial ester of phosphoric acid, and 2-hydroxyethyl acrylate partial ester of phosphoric acid being preferred.

In the general case, it has been noted that stronger acids, as well as larger quantities of any acid, tend to increase the rate at which the adhesive compositions cure. The use of strong acids, e.g., those having $pK_a$ values of about 1 or less, particularly in large amounts, can lead to corrosion problems and tends to deactivate the adhesives, possibly through chelate formation. The use of large amounts of any given acid also tends to give lower adhesion values; but it has been observed that such reductions in adhesion values is not as great when the acidic compound contains one or more polymerizable olefinically unsaturated groups. Thus some degree of experimentation may be required in selecting the acid and the amount of the acid, in order to achieve an acceptable compromise of properties. Currently, it is preferred that the acidic compound be employed in amounts in the range from about 0.05 to 20, preferably about 0.1 to 15, percent by weight, based on the total weight of the adhesive composition. In those cases where the acid does not contain polymerizable moieties, the amount of the acid is preferably in the range from about 0.05 to 5 percent by weight.

The metes and bounds of the sulfonyl-containing compounds of Component (C) which can be utilized in the present invention have been determined through extensive research efforts. Specifically, it has been determined that the sulfonyl-containing compounds useful in the invention can be selected from the group consisting of certain sulfonyl-sulfur, sulfonyl phosphorus and sulfonyl-silicon compounds. The present sulfonyl-containing compounds generally comprise at least one compound containing at least one sulfonyl group having the structure:

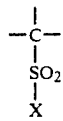

wherein X is hereinafter defined with respect to each type of sulfonyl-containing compound.

The sulfonyl-sulfur compounds of the present invention can be represented by the above structure wherein X is SR', S(O)R', or SO₂R', with R' being essentially any organic or inorganic moiety. R' is preferably hydrogen; lower alkyl such as methyl, ethyl, or propyl; phenyl; phenylmethyl; or an ion such as sodium, potassium, or zinc. R' is most preferably methyl or phenyl. Specific examples of X for the present sulfonyl-sulfur compounds include —SH, —S⁻Na⁺, —SCH₃, —SC₂H₅, —SC₆H₅, —SC₆H₄CH₃; —S(O)H, —S(O)⁻Na⁺, —S(O)CH₃, —S(O)C₂H₅, —S(O)C₆H₅, —S(O)C₆H₄CH₃; —SO₂H, —SO₂⁻Na⁺, —SO₂CH₃, —SO₂C₂H₅, —SO₂C₆H₅, and —SO₂C₆H₄CH₃.

Typical sulfonyl-sulfur compounds include S-phenylbenzenethiosulfonate (diphenyldisulfide-S,S-dioxide); α-diphenyldisulfone (diphenyldisulfide-S,S,S',S'-tetroxide); α-dimethyl-disulfone (dimethyldisulfide-S,S,S',S'-tetroxide), S,S'-ethylene-p-toluene-thiosulfonate, 1,2-dithiane-1,1,2,2-tetroxide, p-tolylsulfinyl-p-toluenesulfone (di-p-tolyldisulfide-S,S,S'-trioxide), 1,2-dithiolane-1,1,2,2-tetroxide, 1,2-dithiane-1,1,2-trioxide, methanethiosulfonic acid, sodium methanethiosulfonate, benzenethiosulfonic acid anhydride, with S-phenylbenzenethiosulfonate and α-diphenyldisulfone being preferred sulfonyl-sulfur compounds.

The sulfonyl phosphorus compounds of the present invention can be represented by the above structure wherein X is P(R")₂ or P(O)(R")₂ with R" being essentially any organic or inorganic moiety. Preferably, R" is independently hydrogen; lower alkyl such as methyl, ethyl, or propyl; lower alkoxy such as methoxy, ethoxy or propoxy; or phenyl. Preferably, R" is ethoxy. Specific examples of X for the sulfonyl phosphorus compounds include —P(CH₃)₂, —P(H)(CH₃), —P(C₂H₅)₂, —P(OCH₃)₂, —P(OC₂H₅)₂, —P(CH₃)(OC₂H₅), —P(C₆H₅)OCH₃, —P(O)(CH₃)₂, —P(O)(H)(CH₃), —P(O)(H)₂, —P(O)(OH)₂, —P(O)(C₂H₅)₂, —P(O)(OCH₃)₂, —P(O)(OC₂H₅)₂, —P(O)(CH₃)(OC₂H₅), and —P(O)(C₆H₅)OCH₃.

Typical sulfonyl phosphorus compounds include phenylsulfonyl diethoxy phosphine oxide, methylsulfonyl dimethylphosphine, methylsulfonyl diethylphosphine oxide, with phenylsulfonyl diethoxy phosphine oxide being preferred.

The sulfonyl-silicon compounds of the invention can be represented by the above structure wherein X is Si(R''')₃ with R''' being essentially any organic or inorganic moiety. Preferably, R''' is independently lower alkyl such as methyl, ethyl or propoyl; hydroxy; lower alkyoxy such as methoxy, ethoxy or propoxy; phenyl; or an oxy salt such as oxy sodium or oxy potassium. Most preferably, R''' is methyl. Specific examples of X for the sulfonyl-silicon compounds include —Si(CH₃)₃, —Si(C₂H₅)₃, —Si(C₆H₅)₃, —Si(OH)₃, —Si(OC₂H₅)₃, —Si(O⁻Na⁺)₃, —Si(CH₃)(OCH₃)₂, —Si(OH)₂(OC₆H₅), and —Si(OC₂H₅)(OCH₃)₂. Typical sulfonyl-silicon compounds include methanesulfonyl trimethylsilane, benzenesulfonyltriethoxysilane, methanesulfonyltrihydroxysilane and ethanesulfonylethoxydimethoxysilane, with methanesulfonyl trimethylsilane being preferred.

Although R', R", and R''' are defined above with respect to preferences for the respective sulfonyl-sulfur, phosphorus and -silicon compounds, R', R", and R''' can, in general, be any substituted or unsubstituted alkyl group containing typically from 1 to 24 carbon atoms; or any substituted or unsubstituted aryl group containing typically from 6 to 30 carbon atoms. Organic R', R", and R''' groups can also be polymeric materials, such as polyolefins or polyurethanes. Inorganic R', R", and R''' groups include H, OH, SH, NH₂, SiOH, Cl, and metal ions such as Na⁺, Mg⁺⁺, Ni⁺⁺, and Al⁺⁺⁺.

The sulfonyl-containing compounds of the present invention are typically utilized in an amount ranging from about 0.05 to 5, preferably about 0.2 to 2 percent by weight based on the total weight of the adhesive composition. The sulfonyl-containing compounds are known in the art and can be prepared by techniques described in the chemical literature available to one of ordinary skill in the art.

Equally as essential as are the compounds containing at least one sulfonyl group and the acidic compounds, both supra, are compounds containing at least one transition metal of Component (D). As used herein, transition metals are those metals which have their valence electrons in a "d" sub-shell. Such metals are found in classes Ib-VII b and VIII on the periodic chart of elements. The preferred metals are copper, zinc, cobalt, vanadium, iron and manganese. Inorganic compounds containing the transition metals can be used, such as the metal salts exemplified by the bromides, chlorides, phosphates, sulfates, sulfides and oxides of the transition metals. Likewise, organic compounds containing the transition metals can be used, such as transition metal salts of organic mono- and poly-carboxylic acids; and mono- and poly-hydroxy compounds, such as cupric acetate, cupric maleate, cupric hexoate, iron naphthenate, cobaltous and cobaltic naphthenate and the like. Particularly preferred organic derivatives are sulfamide and sulfonamide compounds which contain the transition metal, such as the currently preferred cupric saccharinate. This is but a partial listing of suitable organic and inorganic salts; however, other useful salts will be readily obvious to those skilled in the art. The transition metal compounds will be employed in the adhesive compositions of this invention in a range from about 0.05 to 5, preferably about 0.2 to 2.5, percent by weight, based on the total weight of the adhesive composition.

The transition metal-containing organic compounds are typically more soluble in the adhesive compositions of this invention, and they are the preferred compounds. It is important that the transition metal compound, be it organic or inorganic, have some degree of solubility, either in the adhesive composition itself or in an inert solvent which is preferably compatable with the adhesive compositions. Because of the limited solubility of at least some usable transition metal compounds, it can be advantageous to dissolve the compound in the adhesive or inert solvent and filter off the undissolved material.

The isocyanate-functional prepolymers which are employed to form olefinically unsaturated urethane reaction products for optional use in the practice of the invention are well known. Typically, such prepolymers are adducts or condensation products of polyisocyanate compounds having at least two free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least two free, unreacted isocyanate groups.

Polyols useful in preparing isocyanate-functional prepolymers used in the present invention preferably have an average molecular weight of about 300 to 3,000. Suitable polyols include polyalkylene glycols such as polyethylene glycols; polyetherpolyols such as those prepared by addition polymerization of ethylene oxide and a polyol such as trimethylol propane in a ratio to provide unreacted hydroxyl groups in the product; organic hydroxylated elastomers exhibiting second order glass transition temperatures below about 5° C. such as poly(butadiene/styrene) polyols and poly(butadiene) polyols; polyester polyols such as are prepared by polymerizing polyols, such as diethylene glycol, trimethylol propane; or 1,4-butanediol, with polycarboxylic acids, such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linseed oil and blown soya oil; and polyesterpolyols such as are prepared by the polymerization of a lactone such as caprolactone.

Polyisocyanates which can be reacted with polyols to form isocyanate-functional prepolymers for optional use in the present invention can be any monomeric, that is, non-polymeric, isocyanate compound having at least 2 free isocyanate groups, including aliphatic, cycloaliphatic and aromatic compounds. Representative polyisocyanates include without limitation thereto, 2,4-toluene diisocyanate, 2,6-tolulene diisocyanate, 4,4'-diphenylmethane diisocyanate, m- and p-phenylene diisocyanate, polymethylene poly(phenyl isocyanate), hexamethylene diisocyanate, 4,4'-methylene-bis(cyclohexyl isocyanate), isophorone diisocyanate, and other aliphatic, cycloaliphatic and aromatic polyisocyanates, and including mixtures of such polyisocyanates. Currently, cycloaliphatic and aromatic polyisocyanates are preferred.

Hydroxy-functional compounds which can be employed to introduce olefinic unsaturation into the isocyanate-functional prepolymer include, without limitation, hydroxyethyl acrylate, hydroxypropyl methacrylate, hydroxethyl methacrylate, and allyl alcohol.

The butadiene-based elastomeric polymeric materials which are suitable for optional use in the practice of the invention are also well known and can be any elastomer derived from 1,3-butadiene or its halogenated analogs which has a glass transition temperature below ambient temperature and preferably not above about 5° C. Suitable elastomers include butadiene homopolymer, copolymers of butadiene with styrene, acrylonitrile and methacrylonitrile, and such homopolymers and copolymers modified by copolymerization therein of trace amounts (about 0.05 to 5%) of a functional comonomer, such as acrylic acid, methacrylic acid, maleic anhydride, fumeric acid, styrene, and methyl methacrylate.

Polymer-in-monomer syrups suitable for use in the present invention, compositionally as well as their preparation, are well known in the art. Representative syrups, including precursor liquid monomer compounds containing at least one olefinically unsaturated group and their preparation are disclosed in U.S. Pat. Nos. 3,333,025; 3,725,504; and 3,873,640. Briefly, such syrups are conveniently prepared by de-aerating a starting mixture consisting essentially of at least one polymerizable liquid olefinically unsaturated compound and, when used, polymer containing the group $(CH_2-CCl=CHCH_2)_n$, for a short period at about 40° C. under vacuum and then heating the mixture to about 75° C. under an inert gas atmosphere. A catalyst, for example, a free radical-generating catalyst such as benzoyl peroxide or azodiisobutyric acid dinitrile, is then added, preferably in the form of a solution. The quantity of catalyst added is such that it will be completely consumed when the desired viscosity is reached. After the reaction is completed, the polymer-in-monomer syrup is cooled. Preferably, the syrups have a viscosity in the in the range from about 500 to 1,000,000 mPa's at 20° C.

Polymers containing the grouping $(CH_2=CCl-CHCH_2)_n$ wherein n is an integer, are well known in the art under the name neoprene, which is produced by the polymerization of 2-chloro-1,3-butadiene.

Polyvinyl alkyl ethers suitable for use in the adhesive compositions which are described herein are well known in the art. Such ethers will preferably contain 1 to 8 carbon atoms in the alkyl moiety of said ether. Likewise, styrene-acrylonitrile resins and unsaturated polyester resins which are suitable for use in the invention are well known.

The phenoxy resins that may be employed in the present invention are prepared from the reaction of diphenols and epichlorohydrin using a strong base. Suitable diphenol monomers include all those derived from 4,4'-isopropylidenediphenol (bisphenol A). Alternatively, the phenoxy resins may be prepared by the polymerization of a diphenol and the diglycidylether of a diphenol. The phenoxy resins and their preparations are well known in the art and further described in The Encyclopedia of Polymer Science & Technology, Vol. 10, p. 111 (1969).

An exemplary phenoxy resin is PKHJ, a commercial product available through the Union Carbide Company and has the following chemical structure:

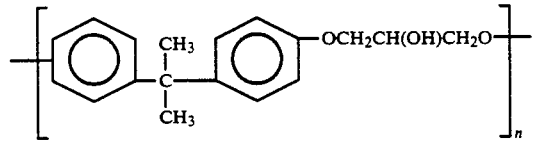

Polymeric materials having an intrinsic viscosity of about 0.1 to 1.3 which are suitable for use in the present invention can be obtained by the polymerization of one or more acrylic and nonacrylic monomers, including mixtures thereof. Exemplary polymeric materials include poly(methyl methacrylate/n-butylacrylate/ethylacrylate) (90/5/5%); poly(n-butylmethacrylate/isobutyl methacrylate) (50/50%); poly(n-butylmethacrylate) and poly(ethylmethacrylate). Preferably, the viscosity will be about midway in the recited range. The use of polymeric materials having such intrinsic viscosities is especially beneficial in acrylic adhesives containing homopolymers and copolymers of 1,3-butadiene.

Elastomeric polymeric materials having second order glass transistion temperatures below about 5° C. or lower can be effective in modifying room temperature flexibility of the adhesive bond. Especially preferred of such elastomers are polychloroprene rubber; polybutadiene rubber; butadiene copolymer rubbers such as acrylonitrile-butadiene, carboxylated acrylonitrile-butadiene and styrene-butadiene rubbers; polyacrylate rubbers such as poly(ethyl acrylate) and poly(ethyl acrylate halogenated vinyl ether acrylic acid) rubbers; and ethylene copolymers such as ethylene vinyl acetate rubbers. Exemplary of such materials is the commercial product HYCAR 1072 copolymer of butadiene and acrylonitrile available from the B. F. Goodrich Company. Other elastomeric polymers having a glass transition temperature below about 5° C. can be employed since, other than the low glass transition temperature, there are no other limitations on the identity of the elastomer except for the specific requirements of the particular adhesive being formulated, such as suitable molecular weight, viscosity characteristics and compatibility with the other ingredients of the adhesive. Such elastomeric polymeric materials are particularly beneficial when incorporated in acrylic adhesives comprising at least one olefinically unsaturated polyurethane.

The above optional materials, when utilized, are employed in the amounts disclosed immediately hereinafter. The amount of said olefinically unsaturated urethane reaction product is in the range from about 10 to 90, preferably about 13 to 83, percent by weight; the amount of said butadiene-based elastomeric polymeric material is in the range from about 1 to 30, preferably about 7 to 27 percent by weight; the amount of said polymer-in-monomer syrup is in the range from about 2 to 60, preferably about 5 to 60 percent by weight; the amount of said polyvinyl alkyl ether, styrene-acrylonitrile resin or unsaturated polyester resin is in the range from about 5 to 75, preferably about 15 to 75 percent by weight; the amount of said homopolymer or copolymer of at least one of styrene and alkyl or hydroxyalkyl esters of acrylic or substituted acrylic acids is in the range from about 2 to 60, preferably about 5 to 60 percent by weight; and the amount of said phenoxy compound is in the range from about 1 to 30, preferably about 5 to 15, percent by weight; said weight percents being based on the total weight of the adhesive composition.

Additional optional ingredients include inorganic fillers to thicken the composition for handling and application. Exemplary inorganic fillers include titanium dioxide, silica, fumed silica, lead oxide, talc, zinc oxide, aluminum oxide, and mixtures thereof. These fillers optionally comprise about 0.1 to 50% by weight, preferably about 5 to 40% by weight, of the adhesive composition of the invention. A preferred thickner is fumed silica comprising from about 0.2 to 10.0 weight percent of the adhesive composition. Pigments may also be added if desired.

The adhesive compositions may also contain stabilizers such as hydroquinone, benzoquinone, t-butyl catechol and other well-known stabilizers to improve shelf life of the composition in concentrations in the range from about 0–5 weight percent.

One significant advantage of the adhesive of the present invention is its ability to accommodate additional adhesive components such as polyols, amines, and polyamines without a deleterious effect on adhesive performance. Examples of such adhesive components which may be desirable to combine with the present adhesive compositions in certain applications include 4-aminobenzoic acid, dodecylamine, amine-terminated butadiene-nitrile rubber, 1,6-diaminohexane, dodecanol and poly(vinyl alcohol). If employed in the present adhesive compositions, such additional adhesive components would be utilized in an amount ranging from about 0.1 to 25, preferably about 0.5 to 5 percent by weight of the total adhesive composition.

The adhesive compositions of the invention are readily prepared by combining the ingredients using any conventional mixing device to obtain a homogeneous mixture.

The adhesive coatings may be brushed, rolled, sprayed, dotted, knifed or otherwise applied to one substrate, but preferably to both substrates in a thickness not to exceed about 60 mils. The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition therebetween. The adhesive should have a thickness less than about 60 mils for optimum results. The smoothness of the surfaces and their clearance (e.g., in the case of nuts and bolts) will determine the required film thickness for optimum bonding. The two metal surfaces and the interposed composition are maintained in engagement until the said adhesive composition has cured sufficiently to bond the said surfaces. Typical curing times to gain handling strength range from about 30 minutes to 4 hours. Ultimate adhesive properties are reached after a period of about 24 hours.

Although the adhesives of the present invention are preferred for bonding metal surfaces, the present adhesive compositions may be applied as an adhesive, primer or coating to any surface or substrate capable of receiving the adhesive. The metals which are preferred for bonding with the present adhesives include zinc, copper, cadmium, iron, tin, aluminum, silver, chromium, alloys of such metals, and metallic coatings or platings of such metals such as galvanized steel.

The following examples are provided for illustration purposes only and are not intended to limit the scope of the invention in any manner.

EXAMPLES 1–5

Compositions Tested with Galvanized Steel Sheets

Five typical adhesive compositions (Examples 1–5) are prepared by blending in a conventional manner the ingredients and amounts set forth in Table 1. Table 1 also shows the lap shear strength of a surface-to-surface bond after 24 hours. The lap shear test is carred out by using two galvanized steel coupons having a thickness of about 10 mils and a surface area of about 1"×3". The coupons are lapped for a distance of ½" and a film of the adhesive composition is applied to each surface. The thickness of the adhesive layer is maintained at 10 mils using glass beads within the joint. The surfaces are pushed together by hand and allowed to rest (without clamping pressure) for 24 hours before the lap shear test is carried out. The lap shear test determines the tension (measured in pounds per square inch) required to rupture the adhesive bond.

The α-diphenyldisulfone of Example 1 is prepared according to the method disclosed in G. C. Denzer et al., *Journal of Organic Chemistry*, 1966, Vol. 31, p. 3418. The α-dimethyl-disulfone of Example 2 is prepared according to the method disclosed in L. P. Farng and J. L. Kice, *Journal of American Chemical Society*, 1981, Vol. 103, p. 1137. The S-phenylbenzenethiosulfonate of Example 3 is supplied by Fluka Chemie AG. The S,S'-ethylene-p-toluenethiosulfonate of Example 4 is supplied by Aldrich Chemical Company, Inc. The 1,2-dithiane-1,1,2,2-tetroxide of Example 5 is prepared according to the method disclosed in L. Field and R. B. Barbee, *Journal of Organic Chemistry*, 1969, Vol. 34, No. 1, p. 36.

TABLE 1

ADHESIVE COMPOSITIONS TESTED WITH GALVANIZED STEEL SHEETS

| Adhesive Ingredients | 1 | 2 | 3 | 4 | 5 |
|---|---|---|---|---|---|
| | Parts by Weight | | | | |
| tetrahydrofurfuryl methacrylate | 8 | 8 | 8 | 8 | 8 |
| Material A | 34 | 34 | 34 | 34 | 34 |
| Material B | 15 | 15 | 15 | 15 | 15 |
| Material C | 9 | 9 | 9 | 9 | 9 |
| α-diphenyldisulfone | 0.45 | — | — | — | — |
| α-dimethyldisulfone | — | 0.3 | — | — | — |
| S-phenylbenzenethiosulfonate | — | — | 0.45 | — | — |
| S,S'-ethylene-p-toluenethiosulfonate | — | — | — | 0.3 | — |
| 1,2-dithiane-1,1,2,2-tetroxide | — | — | — | — | 0.3 |
| Cupric Saccharinate | 0.44 | 0.44 | 0.44 | 0.44 | 0.44 |
| HEMA Phosphate* | 1.7 | 1.7 | 1.7 | 1.7 | 1.7 |
| benzoquinone | 0.02 | 0.02 | 0.02 | 0.02 | 0.02 |
| titanium dioxide | 9 | 9 | 9 | 9 | 9 |
| talc | 20 | 20 | 20 | 20 | 20 |
| fumed silica | 2 | 2 | 2 | 2 | 2 |
| Results of 24 Hour Lap Shear Test (PSI) | 1760 | 1680 | 1820 | 1300 | 700 |

*HEMA Phosphate is 2-hydroxyethyl methacrylate partial ester of phosphoric acid.

The materials listed in Table 1 include:

Material A. A polymer in monomer syrup comprising 24% by weight PKHJ phenoxy resin (Tradename of Union Carbide Company) in tetrahydrofurfuryl methacrylate.

Material B. A polymer in monomer syrup comprising a carboxylated copolymer of acrylonitrile and butadiene [HYCAR 1072 (Tradename of B. F. Goodrich Co.); 24% by weight] in tetrahydrofurfuryl methacrylate.

Material C. A urethane polymer that results from the reaction of toluene diisocyanate and poly(tetramethylene ether) glycol [TERATHANE 1000 (Tradename of DuPont); average molecular weight=1000]. The urethane polymer is end capped with hydroxyethyl methacrylate and has an average molecular weight of 4000.

The results of the Lap Shear Test, which range from 700 to 1760 psi, indicate that the adhesive compositions of the present invention exhibit substantial adhesive performance.

EXAMPLES 6–7

Amine-Containing Formulations

The adhesive composition from example 3 (using S-phenylbenzenethiosulfonate as the sulfonyl-containing compound) is formulated with either 0.55 parts of 4-aminobenzoic acid or 0.75 parts of dodecylamine as an additional ingredient. These compositions were tested as in Example 1 with the following results:

| Example | Adhesive Composition | Lap Shear Strength (PSI: after 24 h cure) |
|---|---|---|
| 6. | Example 3 + 4-aminobenzoic acid | 1190 |
| 7. | Example 3 + Dodecylamine | 510 |

Examples 6 and 7 demonstrate the significant formulating flexibility of the adhesive compositions of the present invention. The addition of an amine additive such as 4-aminobenzoic or dodecylamine acid to Example 3 does not render the adhesive useless and, in the case of 4-aminobenzoic acid, only has a minor impact on adhesive ability. However, the addition of such amine additives to a sulfonyl halide-containing adhesive composition renders the adhesive totally useless due to undesired reaction between the halide compound and the amine additive. The adhesives of the present invention therefore possess significantly more latitude than sulfonyl halide-containing adhesives with respect to the inclusion of additional components such as amine additives.

What is claimed is:

1. A single-package, ambient temperature-curable adhesive composition comprising:
   (A) at least one olefinically unsaturated monomer;
   (B) an acidic compound having at least one organic or inorganic acid group;
   (C) at least one sulfonyl-containing compound selected from the group consisting of sulfonyl-sulfur, sulfonyl-phosphorus and sulfonyl-silicon compounds; said sulfonyl-containing compound containing at least one group having the structure

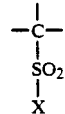

wherein X is SR', S(O)R', SO$_2$R', P(R'')$_2$, P(O)(R'')$_2$ or Si(R''')$_3$ with R', R'', and R''' each independently being essentially any organic or inorganic moiety; and
   (D) at least one organic or inorganic compound containing at least one reducible transition metal.

2. An adhesive composition according to claim 1 wherein the olefinically unsaturated monomer is selected from the group consisting of tetrahydrofurfuryl methacrylate, methyl methacrylate, butyl methacrylate, and ethyl acrylate.

3. An adhesive composition according to claim 2 wherein the olefinically unsaturated monomer is tetrahydrofurfuryl methacrylate.

4. An adhesive composition according to claim 1 wherein the acidic compound is selected from the group consisting of 2-hydroxyethyl methacrylate partial ester of phosphoric acid, and 2-hydroxyethyl acrylate partial ester of phosphoric acid.

5. An adhesive composition according to claim 4 wherein the acidic compound is 2-hydroxyethyl methacrylate partial ester of phosphoric acid.

6. An adhesive composition according to claim 1 wherein the sulfonyl-containing compound is a sulfonyl-sulfur compound and is selected from the group consisting of S-phenylbenzenethiosulfonate, α-diphenyldisulfone, α-dimethyldisulfone, S,S''-ethylene-p-toluenethiosulfonate, and 1,2-dithiane-1,1,2,2-tetroxide.

7. An adhesive composition according to claim 6 wherein the sulfonyl-containing compound is S-phenylbenzenethiosulfonate or α-diphenyldisulfone.

8. An adhesive composition according to claim 1 wherein the sulfonyl-containing compound is a sulfonyl-phosphorus or sulfonyl-silicon compound and is selected from the group consisting of phenylsulfonyl diethyoxy phosphine oxide, methylsulfonyl dimethylphosphine, methylsulfonyl diethylphosphine oxide, methanesulfonyl trimethylsilane, benzene-sulfonyltriethoxylsilane, methanesulfonyltrihydroxysilane, and ethane-sulfonylethoxydimethoxysilane.

9. An adhesive composition according to claim 8 wherein the sulfonyl-containing compound is phenylsulfonyl diethyoxy phosphine oxide or methanesulfonyl trimethylsilane.

10. An adhesive composition according to claim 1 wherein the organic or inorganic compound containing at least one reducible transition metal is an organic compound selected from the group consisting of cupric saccharinate, cupric acetate, cupric maleate, cupric hexoate, iron naphthenate, cobaltous naphthenate, and cobaltic naphthenate.

11. An adhesive composition according to claim 10 wherein the transition metal-containing compound is cupric saccharinate.

12. An adhesive composition according to claim 1 further comprising an additional polymeric material selected from the group consisting of:
(a) at least one olefinically unsaturated urethane reaction product of at least one isocynate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
(b) at least one butadiene-based elastomeric polymeric material selected from the group consisting of:
(1) a homopolymer of butadiene;
(2) a copolymer of butadiene and at least one monomer copolymerizable therewith selected from the group consisting of styrene, acrylonitrile, methacrylonitrile and mixtures thereof;
(3) a modified elastomeric polymeric material selected from the group consisting of butadiene homopolymer and copolymer as previously defined, such as homopolymer and copolymer having been modified by copolymerization therein by trace amounts up to about 5 percent by weight, based on the weight of modified elastomeric material, of at least one functional monomer; and
(4) mixtures thereof;
(c) at least one polymer-in-monomer syrup consisting essentially of
(1) from about 10 to 98 percent by weight of at least one olefinically unsaturated monomeric compound having at least one

group;
(2) from about 2 to 90 percent by weight of at least one polymer derived from such (C)(1) monomers;
(3) from about zero to 30 percent by weight of at least one polymer containing the group $(CH_2-CCl=CHCH_2)_n$, wherein n is an integer; wherein (C)(2) is present as a partial polymerization product of (C)(1) or of (C)(1) in the presence of (C)(3); the mixture of (C)(1) and (C)(2) or of (C)(1), (C)(2) and (C)(3) being a syrup of polymer dissolved or dispersed in unpolymerized monomer, in which syrup the amount of (C)(2) derived from (C)(1) is in the range from about 2 to 90 percent, based on the total weight of (C)(1), (C)(2) and (C)(3);
(d) at least one polymeric material selected from the group consisting of polyvinyl alkyl ether, styrene acrylonitrile resin, unsaturated polyester resin and mixtures thereof, the alkyl moiety of such ether containing from about 1 to 8 carbon atoms;
(e) at least one homopolymer or copolymer of at least one olefinically unsaturated monomer selected from the group consisting of styrene and alkyl or hydroxyalkyl esters of acrylic and methacrylic acid, said ester having about 1 to 18 carbon atoms in the alkyl moiety; and
(f) at least one phenoxy resin comprised of recurring units represented by the formula

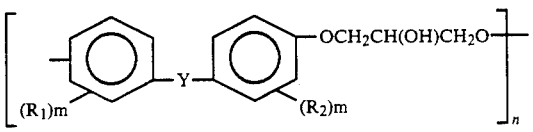

wherein Y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; m is zero or an integer 1–4, n is about 10 to 250; and
(g) mixtures of such polymeric materials.

13. An adhesive composition according to claim 12 further comprising an additional component selected from the group consisting of (a) at least one polymeric material having an intrinsic viscosity in the range from about 0.1 to 1.3, such polymeric material being obtained from the polymerization or copolymerization of at least one styrene monomer, acrylic monomer, substituted acrylic monomer, olefinically-unsaturated non-acrylic monomer, or mixtures thereof; (b) at least one elastomeric material having a second-order glass transition temperature below about 5° C.; and (c) at least one unsaturated dicarboxylic acid ester.

14. A single-package, ambient temperature-curable adhesive composition comprising:
(A) from about 10 to 90 percent by weight of at least 1 olefinically unsaturated monomer;
(B) from about 0.05 to 20 percent by weight of an acidic compound having at least one organic or inorganic acid group;
(C) from about 0.05 to 5 percent by weight of at least one sulfonyl-containing compound selected from the group consisting of sulfonyl-sulfur, sulfonyl-phosphorus, and sulfonyl-silicon compounds; said sulfonyl-containing compound containing at least one group having the structure

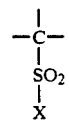

wherein X is SR', S(O)R', SO$_2$R', P(R'')$_2$, P(O)(R'')$_2$ or Si(R''')$_3$ with R', R'', and R''' each independently being essentially any organic or inorganic moiety; and (D) from about 0.05 to 5 percent by weight of at least one organic or inorganic compound containing at least one reducible transition metal.

15. An adhesive composition according to claim 14 wherein the olefinically unsaturated monomer is selected from the group consisting of tetrahydrofurfuryl methacrylate, methyl methacrylate, butyl methacrylate, and ethyl acrylate, and is present in an amount from about 17 to 87 percent by weight; the acidic compound is selected from the group consisting of 2-hydroxyethyl methacrylate partial ester of phosphoric acid, and 2-hydroxy-ethyl acrylate partial ester of phosphoric acid, and is present in an amount from about 0.1 to 15 percent by weight; the sulfonyl-containing compound is selected from the group consisting of S-phenylbenzenethiosulfonate, α-diphenyldisulfone, α-dimethyldisulfone, S,S'-ethylene-p-toluenethiosulfonate, 1,2-dithiane-1,1,2,2-tetroxide, phenylsulfonyl diethyoxy phosphine oxide, methylsulfonyl dimethylphosphine, methylsulfonyl diethylphosphine oxide, methanesulfonyl trimethylsilane, benzenesulfonyltriethoxysilane, methanesulfonyltrihydroxysilane, and ethanesulfonylethoxydimethoxy-silane, and is present in an amount from about 0.5 to 2 percent by weight; and the transition metal-containing compound is selected from the group consisting of cupric saccharinate, cupric acetate, cupric maleate, cupric hexoate, iron naphthenate, cobaltous naphthenate, and cobaltic naphthenate, and is present in an amount from about 0.5 to 2.5 percent by weight; said weight percents being based on the total weight of the adhesive composition.

16. An adhesive composition according to claim 15 wherein the olefinically unsaturated monomer is tetrahydrofurfuryl methacrylate, the acidic compound is 2-hydroxyethyl methacrylate partial ester of phosphoric acid, the sulfonyl-containing compound is S-phenylbenzenethiosulfonate, and the transition metal-containing compound is cupric saccharinate.

17. An adhesive composition according to claim 14 further comprising a polymeric material selected from the group consisting of:

(a) at least one olefinically unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;

(b) at least one butadiene-based elastomeric polymeric material selected from the group consisting of:
(1) a homopolymer of butadiene;
(2) a copolymer of butadiene and at least one monomer copolymerizable therewith selected from the group consisting of styrene, acrylonitrile, methacrylonitrile and mixtures thereof;
(3) a modified elastomeric polymeric material selected from the group consisting of butadiene homopolymer and copolymer as previously defined, such as homopolymer and copolymer having been modified by copolymerization therein by trace amounts up to about 5 percent by weight, based on the weight of modified elastomeric material, of at least one functional monomer; and (4) mixtures thereof;

(c) at least one polymer-in-monomer syrup consisting essentially of
(1) from about 10 to 98 percent by weight of at least one olefinically unsaturated monomeric compound having at least one

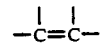

group;
(2) from about 2 to 90 percent by weight of at least one polymer derived from such (C)(1) monomers;
(3) from about zero to 30 percent by weight of at least one polymer containing the group $(CH_2-CCl=CHCH_2)_n$, wherein n is an integer; wherein (C)(2) is present as a partial polymerization product of (C)(1) or of (C)(1) in the presence of (C)(3); the mixture of (C)(1) and (C)(2) or of (C)(1), (C)(2) and (C)(3) being a syrup of polymer dissolved or dispersed in unpolymerized monomer, in which syrup the amount of (C)(2) derived from (C)(1) is in the range from about 2 to 90 percent, based on the total weight of (C)(1), (C)(2) and (C)(3);

(d) at least one polymeric material selected from the group consisting of polyvinyl alkyl ether, styrene acrylonitrile resin, unsaturated polyester resin and mixtures thereof, the alkyl moiety of such ether containing from about 1 to 8 carbon atoms;

(e) at least one homopolymer or copolymer of at least one olefinically unsaturated monomer selected from the group consisting of styrene and alkyl or hydroxyalkyl esters of acrylic and methacrylic acid, said ester having about 1 to 18 carbon atoms in the alkyl moiety; and (f) at least one phenoxy resin comprised of recurring units represented by the formula

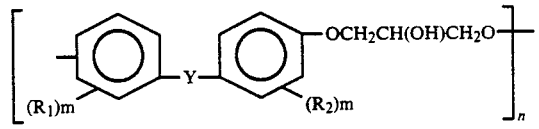

wherein Y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; m is zero or an integer 1-4, n is about 10 to 250; and (g) mixtures of such polymeric materials.

18. An adhesive composition according to claim 17 wherein the amount of said olefinically unsaturated urethane reaction product is in the range from about 10 to 90 percent by weight; the amount of said butadiene-based elastomeric polymeric material is in the range from about 1 to 30 percent by weight; the amount of said polymer-in-monomer syrup is in the range from about 2 to 60 percent by weight; the amount of said polyvinyl alkyl ether, styrene-acrylonitrile resin or unsaturated polyester resin is in the range from about 5 to 75 percent by weight; the amount of said homopolymer or copolymer of at least one of styrene and esters of acrylic or substituted acrylic acids is in the range from about 2 to 60 percent by weight; the amount of said phenoxy compound is in the range from about 1 to 30 percent by weight; said weight percents being based on the total weight of the adhesive composition.

19. An adhesive composition according to claim 18 wherein the amount of said olefinically unsaturated urethane reaction product is in the range from about 13 to 83 percent by weight; the amount of said butadiene-based elastomeric polymeric material is in the range from about 7 to 27 percent by weight; the amount of said polymer-in-monomer syrup is in the range from about 5 to 60 percent by weight; the amount of said polyvinyl alkyl ether, styrene-acrylonitrile resin or unsaturated polyester resin is in the range from about 15 to 75 percent by weight; the amount of said homopolymer or copolymer of at least one of styrene and esters of acrylic or substituted acrylic acids is in the range from about 5 to 60 percent by weight; the amount of said phenoxy compound is in the range from about 5 to 15 percent by weight; said weight percents being based on the total weight of the adhesive composition.

20. An adhesive composition according to claim 17 further containing at least one additional component selected from the group consisting of (a) at least one polymeric material having an intrinsic viscosity in the range from about 0.1 to 1.3, such polymeric material being obtained from the polymerization or copolymerization of at least one styrene monomer, acrylic monomer, substituted acrylic monomer, olefinically-unsaturated non-acrylic monomer, or mixtures thereof; (b) at least one elastomeric material having a second-order glass transition temperature below about 5° C.; and (c) at least one unsaturated dicarboxylic acid ester.

21. An adhesive composition according to claim 14 further comprising an additional adhesive component selected from the group consisting of polyols, amines, and polyamines.

* * * * *